United States Patent Office 3,230,342
Patented Jan. 18, 1966

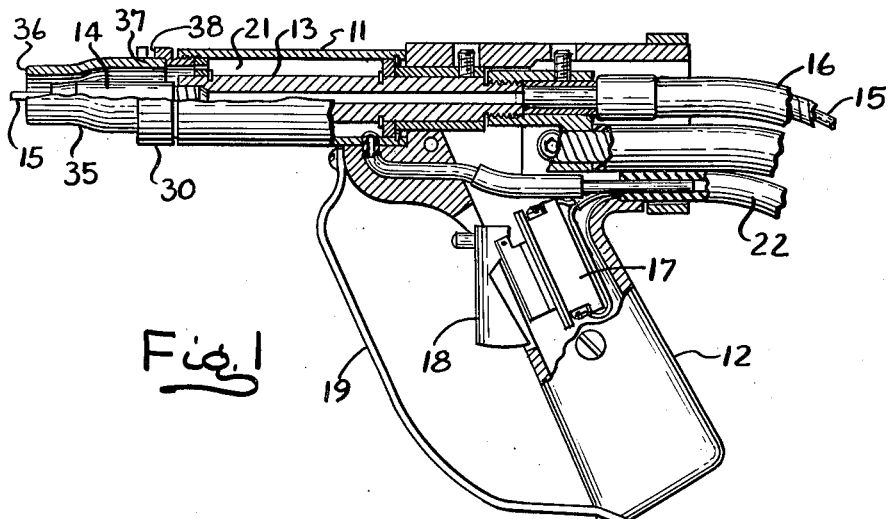
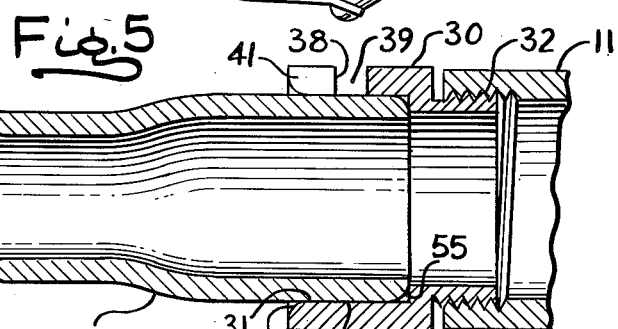
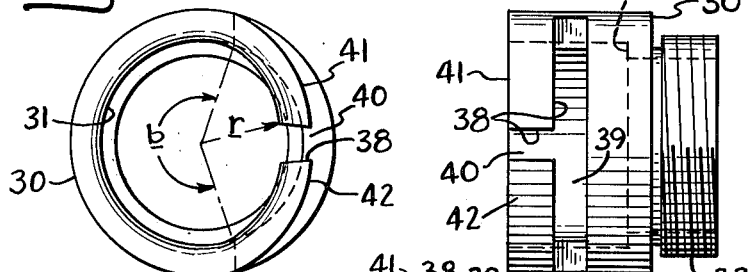
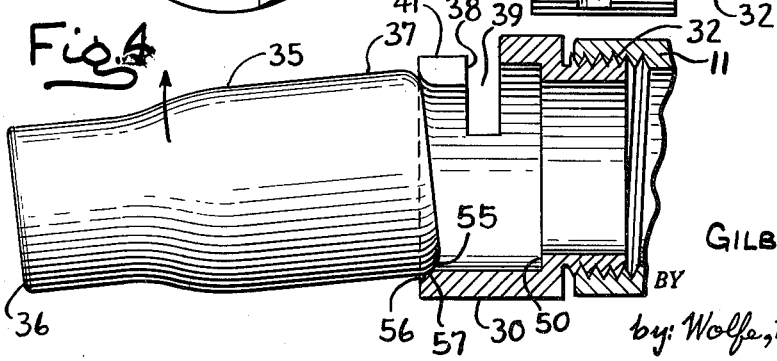

1

3,230,342
FRICTIONAL GAS CUP ASSEMBLY FOR
WELDING GUN
Gilbert F. Meyer, Milwaukee, Wis.
(3828 Oakton St., Skokie, Ill.)
Filed Aug. 27, 1963, Ser. No. 304,893
8 Claims. (Cl. 219—130)

The present invention relates to welding guns and more specifically to a gas-directing tip or shield assembly for guns of the continuous wire-feed type.

Manual welding guns are in common usage in which the welding wire is fed axially through the gun in a continuous length under the control of a trigger or the like. For the purpose of shielding the arc, an inert gas is fed to the gun for discharge through a so called "gas cup" which surrounds the wire at the point of exit and which is specially shaped to provide a stream which is coordinated with the wire size and the other welding conditions. Conventional gas cups are made of copper, brass, or other good conducting metal. However, because of their exposed position, the proximity to the weld, and the necessity for changing the cup when making a change in the welding conditions, it is desirable to provide a gas cup which allows for quick and easy replacement and adjustment so that the "down" time of the welding gun is minimized so that a long useful life is obtained.

The primary object of the present invention is to provide an improved gas cup assembly for a welding gun which permits the cup to be quickly and easily removed or adjusted free of the effects of corrosion, oxidation, and the like. It is another object to provide a gas cup and socket construction in which the cup is reliably secured in working position in spite of the wide temperature changes and the incidental blows to which the cup may be subjected in use. It is, moreover, one of the objects of the invention to provide a gas cup assembly in which the cup need not be specially machined and need not be inserted into the socket, or held, in any special orientation in order to insure retention; consequently, it is an object to provide a device of the present type which permits the cup to be manufactured using low tolerances, at lowest possible cost, and with minimum loss of time in the operation of the welding gun.

It is a further object of the present invention to provide a gas cup for a welding gun which may be manually rotated as necessary to minimize wear or erosion on one side where the gun is habitually moved in the same direction by the operator as, for example, from left to right, thereby equalizing the wear and insuring a concentrically directed stream of gas, enabling a single cup of the present design to be employed long past the point where replacement of a more conventional gas cup would become necessary.

It is still another object of the present invention to provide a gas cup assembly which is characterized by an inherently "stiff" frictional retention but in which provision is made for cammed entry so that a replacement cup may be easily "rocked" into position in its receiving socket.

Other objects and advantages of the invention will be apparent upon reading the attached detailed description and upon reference to the drawing in which:

FIGURE 1 shows a side view of a welding gun to which the present invention has been applied with parts broken away to reveal the internal construction.

FIGS. 2 and 3 are top and front views respectively of the socket portion of the cup.

FIG. 4 shows a gas cup being "rocked" into position in its socket.

FIG. 5 shows the cup and the socket fully assembled.

2

While the invention has been described in connection with a preferred embodiment, it will be understood that the invention is not limited to the particular form illustrated but it is intended, on the contrary, to cover the various modifications and alternative constructions included within the spirit and scope of the appended claims.

Turning now to FIG. 1, there is shown a welding gun having a frame which includes a barrel 11 and a pistol grip 12. Extending centrally within the barrel is a head tube 13 having a contact tip 14 and which conducts a continuous length of welding wire 15. The welding wire is fed from a suitable reel through a flexible guide tube 16. For the purpose of advancing the wire, a motor drive (not shown) having a constant but adjustable feed is provided at the reel under the control of a switch 17 having a trigger 18 which is built into the pistol grip. A heat shield 19 serves to shield the hand of the operator from the radiant heat at the weld. Current is conducted to the contact tip 14 through a power cable which may, if desired, be liquid cooled.

For the purpose of conducting shielding gas to the region of the weld, an annular space 21 is provided within the gun barrel and in communication with a flexible gas conduit 22 which is connected to a source of gas under slight pressure. In use, the welding wire is fed out of the front end of the gun under the control of trigger 18 and surrounded by shielding gas flowing from space 21 which surrounds the wire feeding means of the gun.

In accordance with the present invention a cup assembly is provided including a socket having a cylindrical recess dimensioned to receive a cylindrical gas cup, with means being provided in the wall of the socket for frictionally retaining the cup upon seated insertion thereof while permitting the cup to be progressively rotated to balance wear and erosion. Thus, referring to the drawing, there is provided a socket 30 of cylindrical shape having an inner wall 31 and a threaded connection 32 for screwing into the front end of the frame of the gun. The gas cup, indicated at 35, is in the form of a cylinder having a tip 36 and a base portion 37 dimensioned to seat in the socket. To provide strong frictional retention, the socket is made of resilient metal and a T-shaped slot 38 is formed therein having an axial or leg section 39 and a transverse section 40. Such a cut defines a pair of symmetrical tabs 41, 42 which are bent radially inward as shown in FIGS. 3 and 4 to a minimum radius $r$ thereby to define frictional lugs capable of applying a high degree of inward squeezing force upon the base of the cup 35.

Since the gas cup is in exposed position and subject to inadvertent blows from any direction, the socket is so formed that continuous rigid support is provided for the base portion of the cup for a substantial portion of its length. Thus I provide an internal shoulder or seat 50 which is spaced inwardly from the slot portion by an axial distance $d$ so that the end of the cup is supported about its entire periphery. Moreover, the slotting in the pockets is preferably such as to occupy less than 180° so that substantially more than 180° (see angle $b$, FIG. 3) of uninterrupted stock is available to embrace the cup. In short, using the preferred construction, there is no possibility that a sharp sideways blow against the cup, from the left as viewed in FIG. 3, will tend to dislodge the cup or result in outward springing of the retaining lugs 41, 42.

It is part of the invention in one of its aspects to provide camming surfaces between the socket and the cup to permit the cup to be engaged along one edge and "rocked" into an alined position accompanied by outward camming of the retaining lugs. In the preferred embodiment this is accomplished by forming a curved surface 55 on the outer lip of the cup and a curved, inwardly guiding surface 56 on the inside lip of the socket. The curved surface 56 is preferably formed by a machining operation incident to making the socket and prior to the time that the lugs 41, 42 are deformed inwardly. During installation contact is made along one edge, as at 57, and the cup is rocked in the direction of the arrow into a condition of alinement, with the outer lip surface 55 on the cup crowding outwardly against the surface 56 on the inside of the lugs so that the lugs are effectively cammed outwardly to a stressed position, whereupon the cup may be pushed endwise into seated position on the shoulder 50 as shown at FIG. 5. Thus the construction is to be contrasted with conventional cup mounts employing screw threads or the like which tend to bind as a result of heat and corrosion and where a pipe wrench may be required in order to release a worn cup from its socket. Because of the fact that the surface of the cup base is smooth and uninterrupted, the cammed entry of the cup may be further facilitated by twisting the cup as it is rocked and as inward seating force is applied to it.

It is one of the features of the present invention that the base surface of the gas cup is smoothly continuous and free of any bayonet-type connection or other interruption permitting the cup to be twisted progressively in the socket by ordinary hand pressure from time to time during the life of the cup. Thus it will be appreciated by one skilled in the art that erosion of the cup at its front end may not take place evenly where the welding conditions are non-symmetrical, as for example, where the gun is moved uniformly from left to right, causing the arc to be drawn slightly to the left to produce an unbalanced wearing away of the cup. Such unbalance is particularly noted where a gun of the present type is used under outdoor conditions, particularly in the presence of wind, where it is common practice to have the arc largely recessed within the gas cup making the cup even more vulnerable to the effects of heat and unbalanced erosion. Such condition, if allowed to continue, results in a non-symmetrical discharge of gas and the cup is usually replaced when this begins to occur. However, using the present cup, the operator may simply rotate it with hand pressure from time to time so that the erosion which may occur is evenly distributed and so that the cup may remain on the gun for much longer periods than has been possible heretofore. This fact, combined with the fact that the cup is of simple cylindrical shape, without any special locking surfaces or projections, means that the gas cup expense for a given gun, over a period of time, is reduced to a minimum.

In the following claims the term "frictional retaining lug," while aptly readable upon the integral lug construction used by applicant in the preferred embodiment, is obviously not limited to lugs formed by the particular slot or shape of slot which has been disclosed but the term is, on the contrary, broad enough to include other specific constructions of lugs or frictional elements capable of exerting substantial, inwardly directed pressure upon the smooth outer surface of the inserted cup.

I claim as my invention:

1. In a welding gun of the type having a frame and having means for feeding a continuous length of welding wire axially from the front end thereof as well as means for conducting shielding gas thereto, the combination comprising a cylindrical socket secured to the front end of the gun and having an inner wall, a cylindrical gas cup having a base portion dimensioned to fit into said socket, the socket being formed of resilient metal transversely slotted to define an integral lug, said lug being inwardly sprung radially into frictional engagement with the base portion of the gas cup, the socket providing an internal shoulder spaced inwardly beyond the slotted portion so that when the cup is fully inserted into bottoming engagement against the shoulder the end of the base portion is surrounded by a continuous embracing ring of metal.

2. In a welding gun of the type having a frame and having means for feeding a continuous length of welding wire axially from the front end thereof as well as means for conducting shielding gas thereto, the combination comprising a cylindrical socket secured to the front end of the gun and having an inner wall, a cylindrical gas cup having a base portion dimensioned to fit into said socket, the socket being formed of resilient metal transversely slotted to define an integral lug, said lug being inwardly sprung radially into frictional engagement with the base portion of the cup for applying a high degree of inward pressure upon said cup, and the base of the cup being formed to present a smooth outer surface permitting rotation of the cup by manual grasping and in the face of the frictional force exerted by the lug.

3. In a welding gun of the type having a frame and having means for feeding a continuous length of welding wire axially from the front end thereof as well as means for conducting shielding gas thereto, the combination comprising a cylindrical socket secured to the front end of the gun and having an inner wall, a cylindrical gas cup having a base portion dimensioned to fit into said socket, the socket being formed of resilient metal transversely slotted to define an integral lug, said lug being inwardly spring radially into frictional engagement with the base portion of the gas cup, the socket providing an internal shoulder spaced inwardly beyond the slotted portion to provide bottoming engagement, the slotted portion of the socket subtending an angle substantially less than 180° so that the cup is held positively against displacement in the face of lateral blows from any direction.

4. In a welding gun of the type having a frame and having means for feeding a continuous length of welding wire axially from the front end thereof as well as means for conducting shielding gas thereto, the combination comprising a cylindrical socket secured to the front end of the gun and having an inner wall, a cylindrical gas cup having a base portion dimensioned to fit into said socket, an inwardly sprung lug on the wall of said socket for frictionally engaging the base portion of the cup when the cup is inserted into seated position, the outer lip of the gas cup and the inner lip of the socket being smoothly rounded so that when the cup is engaged adjacent the lip along one side of its base and rocked into alined position, camming engagement occurs at the other side accompanied by outward springing of the lug thereby permitting manual insertion in spite of strong inward springing pressure exerted by the lug.

5. In a welding gun of the type having a frame and having means for feeding a continuous length of welding wire axially from the front end thereof as well as means for conducting shielding gas thereto, the combination comprising a cylindrical socket secured to the front end of the gun and having an inner wall and shoulder, a cylindrical gas cup having a base portion dimensioned to fit into said socket, means providing an inwardly sprung lug at the wall of said socket for frictionally coupling the cup and socket when the cup is inserted into seated position against said shoulder, at least the outer lip of the cup or the inner lip of the socket being smoothly rounded so that when the cup is seated against the lip of the socket and rocked to alined position therewith camming engagement occurs between them causing the lug to be spread outwardly permitting manual insertion of the cup fully against said shoulder.

6. In a welding gun of the type having a frame and having means for feeding a continuous length of welding wire axially from the front end thereof as well as means for conducting a shielding gas thereto, the combination comprising a cylindrical socket secured to the front end of the gun and having an inner wall, a cylindrical gas cup having a base portion dimensioned to fit into said socket, the wall of the socket having a resilient lug sprung radially inward for pressing upon the cup to retain the latter seated in the socket, the base portion of the gas cup having a smooth and continuous outer surface and the force which is exerted by said resilient lug being such as to permit periodic rotation of the cup by grasping and twisting by the hand of the operator thereby to equalize wear and erosion.

7. In a welding gun of the type having a frame and having means for feeding a continuous length of welding wire axially from the front end thereof as well as means for conducting a shielding gas thereto, the combination comprising a cylindrical socket secured to the front end of the gun and having an inner wall, a cylindrical gas cup having a base portion dimensioned to fit into said socket, one of the members including the cup and socket having an integral lug permanently sprung radially against the mating surface on the other member to retain the cup seated in the socket, and the said mating surface being smooth to permit manual twisting as the cup is inserted.

8. In a welding gun of the type having a frame having means for feeding continuous length of welding wire axially from the front end thereof as well as means for conducting shielding gas thereto, the combination comprising a cylindrical socket secured to the front end of the gun and having an inner wall and shoulder, a cylindrical gas cup having a base portion dimensioned to fit into said socket, the socket being formed of resilient metal and having a T-shaped slot formed therein to define a pair of integral lugs, said lugs being bent radially inward for frictionally engaging the base portion of the cup when the cup is inserted into position against said shoulder, means defining cooperable cam surfaces on the outer lip of the cup and the inside lip of the socket so that when said cup is seated against said lip of the socket and rocked into alinement therewith said lugs are cammed outwardly to permit manual insertion of said cup against said shoulder.

References Cited by the Examiner

UNITED STATES PATENTS

| 2,120,243 | 6/1938 | Droll | 219—146 |
| 3,093,728 | 6/1963 | Adamson | 219—130 |

FOREIGN PATENTS 816,632   7/1959   Great Britain.

RICHARD M. WOOD, *Primary Examiner.*